June 20, 1961 Q. W. SIMKINS Re. 25,002

NONLINEAR TERMINATING NETWORKS

Original Filed Feb. 25, 1955

INVENTOR
Q. W. SIMKINS
BY
ATTORNEY

United States Patent Office

Re. 25,002
Reissued June 20, 1961

25,002

NONLINEAR TERMINATING NETWORKS

Quinton W. Simkins, Chatham, N.J., assignor to Bell Telephone Laboratories, Incorporated, New York, N.Y., a corporation of New York Original No. 2,763,841, dated Sept. 18, 1956, Ser. No. 490,474, Feb. 25, 1955. Application for reissue Aug. 27, 1958, Ser. No. 757,892
3 Claims. (Cl. 307—106)

Matter enclosed in heavy brackets [ ] appears in the original patent but forms no part of this reissue specification; matter printed in italics indicates the additions made by reissue.

This invention relates to terminating arrangements for signal transmission networks and more particularly to termination circuits for electrical delay lines having nonlinear loads.

It is well known that a mismatch of impedances on a line normally leads to the existence of reflections and to a consequent loss of power. The generation of such undesirable reflections can have serious consequences in addition to the power loss in some types of pulse information systems such as digital computers, wherein such reflected pulses can cause false operation and produce erroneous results.

One of the most commonly utilized components in such digital computers is the electrical delay line which may be used to equalize delays through various paths and align in time corresponding signals and as a low capacity rapid access memory. The problem of unwanted reflections from misterminations is aggravated in these computer delay line applications by the nonlinear impedance characteristics of the logic and amplifier circuits into which the delay line will work.

It is a general object of this invention to suppress undesirable reflections on a line generated by an impedance mismatch existing on the line.

More specifically, it is an object of this invention to provide a terminating arrangement for suppressing in electrical delay lines undesirable reflections arising from termination elements having nonlinear impedance characteristics.

It is a further object of this invention to provide a terminating circuit for an electrical delay line which prevents the line from being overterminated for all amplitudes of the input pulse signal.

These and other objects of this invention are attained in one specific embodiment of the invention in which a unilateral impedance element is utilized to deliberately underterminate an electrical delay line whereby the impedance of the terminating circuits can never exceed the characteristic impedance of the line.

An examination of the nature of the reflections generated by an impedance mismatch discloses that the coefficient of reflection $\Gamma_L$ may be expressed as:

$$\Gamma_L=\frac{Z_L-Z_0}{Z_L+Z_0} \qquad (1)$$

where $Z_L$=terminating impedance
$Z_0$=characteristic impedance of the line.

From Equation 1 it can be seen that for resistive impedances for all frequencies involved:

1. No reflections occur when $R_L=R_0$, i.e., when the impedances are matched;

2. Positive reflections occur when $R_L>R_0$, i.e., when the line is overterminated; and 3. Negative reflections occur when $R_L<R_0$, i.e., when the line is underterminated.

Positive reflections means that the polarity of the reflected pulse is the same as the polarity of the incident pulse. Conversely, negative reflections mean that the polarity of the reflected pulse is the opposite of that of the incident pulse. The character of the nonlinear load into which the delay line must work in many of its applications, as described above, is such that its impedance will vary above and below the characteristic impedance of the delay line and thus produce both positive and negative reflections.

In accordance with an aspect of the invention, a normally nonconducting unilateral impedance element, such as a diode, is connected to the output terminals of the delay line. The diode is biased so that the pulse voltage at which the diode becomes conducting divided by the pulse current at this time is equal to the delay line characteristic resistance, thus establishing this value as the maximum resistance which can be presented to the delay line by the load. As a result, the line is never overterminated and positive input pulses, for example, will give rise only to negative reflections. These may be absorbed by a properly poled unidirectional impedance match connected to the input terminals of the line.

It is therefore a feature of this invention that a unilateral impedance element be connected to the output of an electrical delay line to prevent the line load impedance from exceeding the characteristic impedance of the line whereby only negative reflections can occur.

It is a further feature of this invention that the unilateral impedance element normally be biased in a nonconducting state, the turnover point of the element being at the point where the load impedance corresponds to the line characteristic impedance.

It is a still further feature of this invention that a properly poled unidirectional impedance circuit connected to the input end of the delay line dissipates the negative reflections arising from the undertermination of the line.

These and other desirable features of this invention may be completely understood from the following detailed description, together with the accompanying drawing, in which.

Figure 1:
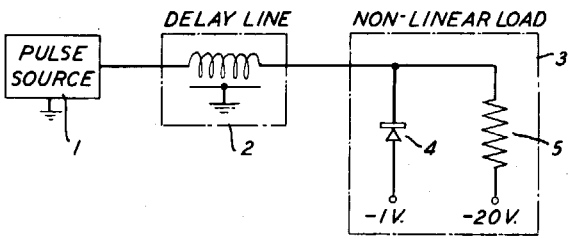
FIG. 1 is a partially schematic diagram of a delay line network terminated by a load having nonlinear impedance characteristics.

Turning now to the drawing, the delay line network shown in FIG. 1 comprises a pulse source 1, which may be any one of a number of circuit components utilized in information processing systems, a delay line 2, the input terminal of which is connected to the pulse source, and a nonlinear load impedance 3 connected to the output terminal of the delay line. The load impedance 3 comprises a diode 4, poled so as to be in the forward direction for negative pulses and a resistance 5. Advantageously, a source of bias potential of minus one volt is connected to the diode 4 whereby the diode changes state from a low impedance to a high impedance condition when the input pulse becomes more positive than this value. This value of bias potential, like those of the other potentials disclosed in this specification is dependent upon the amplitude of the applied input pulse and is intended merely to be exemplary. The resistance 5 is connected to a source of negative potential, which advantageously may be minus twenty volts. The load impedance 3 is the schematic equivalent of the type of nonlinear terminating impedance into which the delay line will work in pulse information systems as described above and normally comprises germanium diode and transistor logic and amplifier circuits employing a large number of component elements.

Figure 2:
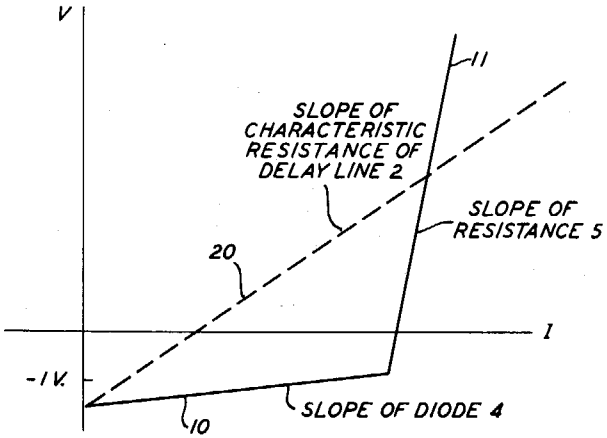
FIG. 2 is a graph showing the voltage-current characteristics of the nonlinear load impedance of FIG. 1.

The V—I characteristic of the load impedance 3 is shown in FIG. 2 of the drawing. The effective resistance which this impedance presents to the delay line is the pulse voltage divided by the pulse current. As can be seen from the graph, the load resistance is essentially the low forward resistance of the diode 4, shown by curve 10, until the pulse becomes more positive than minus one volt, at which point the diode is backbiased and the load resistance becomes essentially that of the resistor 5, as shown by curve 11. The characteristic resistance of the delay line 2 which, disregarding end effects due to reactive components, can be assumed to be constant, is shown by curve 20. Thus, it can be seen that the terminating resistance is dependent upon the amplitude of the input pulse and varies above and below the characteristic impedance of the line. For small currents the line is underterminated, but for currents above a predetermined value the line is overterminated. Both positive and negative reflections therefore may be sent back to the input end of the line where, if another mistermination exists, further reflections may be created to travel back to the line output and give rise to false operation.

Figure 3:
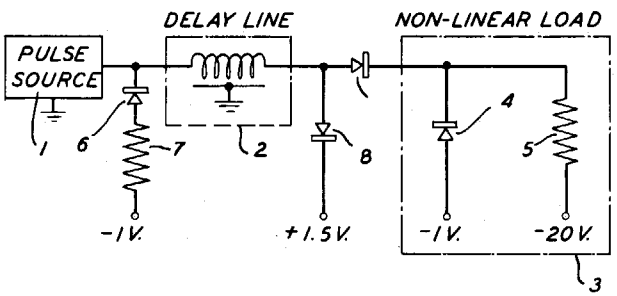
FIG. 3 is a schematic diagram of a delay line network having a terminating arrangement in accordance with an embodiment of the instant invention.
Figure 4:
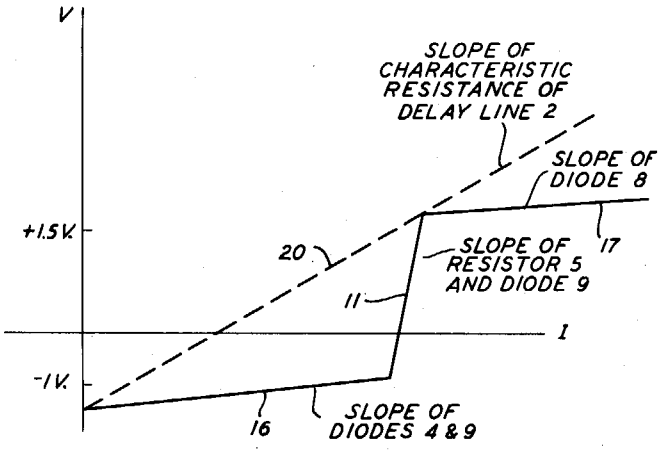
FIG. 4 is a graph showing the voltage-current characteristics of the terminating arrangement of FIG. 3.

In accordance with an aspect of this invention, this problem is resolved by a modification of the V—I characteristic of FIG. 2. This is accomplished by the circuit of FIG. 3 in which the pulse source 1 is connected to the input of the delay line 2 and to a diode 6, poled in the forward direction for negative pulses. Diode 6 is connected to one terminal of a resistor 7, the other terminal of which is connected to a source of negative voltage which advantageously may be one volt. The output of the delay line 2 is connected to a diode 8 which is poled in the forward direction for positive pulses. A source of positive bias voltage, which advantageously may be one and one-half volts, is connected to the diode 8. The delay line 2 also is connected through an isolating diode 9, poled in the forward direction for positive pulses, to the load impedance 3. This circuit is based on the use of a deliberate undertermination for positive pulses at the output end of the delay line 2 as can be seen from the V—I characteristic in FIG. 4.

Positive going input pulses from the pulse source 1 travel down the delay line 2 to the diode 8 and through the diode 9 to the load impedance 3. As the diode 8 is held in the non-conducting condition by the positive one and one-half volt source, only the low forward resistances of diodes 9 and 4 effectively comprise the load until the input pulses reach a value of minus one volt, as shown by curve 16 of FIG. 4. At this point, diode 4 is backbiased to the nonconducting state, diode 8 remains nonconducting and only the resistance of resistor 5 plus the low forward resistance of diode 9 (effectively that of resistor 5 alone) comprises the delay line load as shown by curve 11. As the input pulse becomes more positive than plus one and one-half volts, diode 8 begins to conduct and, since it is connected substantially in parallel with load impedance 3, effectively comprises the load impedance as shown by curve 17.

Thus, the effective load resistance presented by this new combination is a maximum when the pulse voltage is just sufficient to bring diode 8 to its turnover point. As this point is selected to correspond to the intersection of curve 11 and the delay line characteristic curve 20 and thereby is equal to the delay line characteristic resistance, and reflections created are negative since the line is never overterminated.

In accordance with an aspect of this invention, the negative reflections are absorbed when they arrive at the input end of the line by the combination of diode 6 and resistor 7. These components are chosen to match the impedance of the delay line 2 so no energy will be sent back to the output end of the line in the form of positive reflections to cause false operation in the circuits connected to that end of the line. Accordingly, by underterminating the delay line only reflected pulses of opposite polarity to the applied pulses appear back at their input terminals of the delay line where they can be absorbed thereby preventing multiple reflections and false information storage on reflected pulses.

It is to be understood that the circuits discussed above are merely illustrative of the application of the principles of the invention. By proper polarization of the diodes and selection of biasing potentials, a termination circuit for negative input pulses may be constructed. Numerous other terminating arrangements may be devised by those skilled in the art without departing from the spirit and scope of the invention.

What is claimed is.

1. A pulse network comprising a delay line having input and output terminals, a source of pulses connected to said input terminal, a load having nonlinear impedance characteristics connected to said output terminal whereby an impedance mismatch between said load and said delay line causes said pulses to be reflected back to the input terminal of the line, first terminating means including a first unilateral impedance means connected to said output terminal, a source of bias potential connected to said unilateral impedance means normally maintaining said unilateral impedance means in a nonconducting state, the amplitude of said bias potential being sufficient to allow said terminating means to conduct when the load impedance matches the characteristic impedance of the delay line and prevent the line from being overterminated, second terminating means including a second unilateral impedance means connected to said input terminal, bias means connected to said second unilateral impedance means and a resistor connected between said last-mentioned bias means and said second unilateral impedance means, said second terminating means being adapted to present an impedance which matches the characteristic impedance of said delay line to negative pulses reflected from said output terminal.

2. A pulse network in accordance with claim 1 wherein said first unilateral impedance means connected to said output terminal is poled in one direction to permit the passage of pulses of one polarity therethrough and said second unilateral impedance means connected to said input terminal is poled in the opposite direction to permit the passage of pulses of the opposite polarity therethrough.

*3. A pulse shaper comprising a polarity reversing reflecting delay line, means to couple pulse signals of a given polarity to the input of said delay line and a series circuit coupled across the input of said delay line including a resistor having a value equal to substantially the characteristic impedance of said delay line and a rectifier poled to respond to the pulse signals of said given polarity to terminate the input of said delay line in an open circuit and to respond to pulse signals of the opposite polarity to terminate the input of said delay line in said characteristic impedance.*

References Cited in the file of this patent or the original patent

UNITED STATES PATENTS 2,727,143 Slutz ---------- Dec. 13, 1955